US008667256B1

(12) United States Patent
Coon et al.

(10) Patent No.: US 8,667,256 B1
(45) Date of Patent: *Mar. 4, 2014

(54) SYSTEMS AND METHOD FOR MANAGING DIVERGENT THREADS IN A SIMD ARCHITECTURE

(75) Inventors: Brett W. Coon, San Jose, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 12/476,088

(22) Filed: Jun. 1, 2009

Related U.S. Application Data

(63) Continuation of application No. 11/180,499, filed on Jul. 13, 2005, now Pat. No. 7,543,136.

(51) Int. Cl.
G06F 7/38 (2006.01)
G06F 9/00 (2006.01)
G06F 9/44 (2006.01)
G06F 15/00 (2006.01)

(52) U.S. Cl.
USPC ......................................................... 712/228

(58) Field of Classification Search
None
See application file for complete search history.

(56) References Cited

U.S. PATENT DOCUMENTS

| 5,081,574 | A | | 1/1992 | Larsen et al. |
| 5,430,854 | A | * | 7/1995 | Sprague et al. ............... 712/236 |
| 5,555,428 | A | * | 9/1996 | Radigan et al. ................ 712/22 |
| 6,079,008 | A | * | 6/2000 | Clery, III ........................ 712/11 |
| 7,543,136 | B1 | * | 6/2009 | Coon et al. ..................... 712/228 |
| 7,617,384 | B1 | * | 11/2009 | Coon et al. ..................... 712/220 |
| 7,761,697 | B1 | * | 7/2010 | Coon et al. ..................... 712/233 |

OTHER PUBLICATIONS

Bronson et al.; Experimental Application-Driven Architecture Analysis of an SIMD/MIMD Parallel Processing System; 1990; IEEE.*
Eggers, et al. "Simultaneous Multithreading: A Platform for Next-Generation Processors," IEEE Micro, vol. 17, No. 5, pp. 12-19, Sep./Oct. 1997.
Eggers, et al. "Simultaneous Multithreading: A Platform for Next-Generation Processors," IEEE Micro, vol. 17, No. 5, pp. 12-19. Sep./Oct. 1997.
Office Action. U.S. Appl. No. 11/557,082. Apr. 2, 2009.

* cited by examiner

*Primary Examiner* — Corey S Faherty
(74) *Attorney, Agent, or Firm* — Patterson + Sheridan, L.L.P.

(57) ABSTRACT

One embodiment of a computing system configured to manage divergent threads in a thread group includes a stack configured to store at least one token and a multithreaded processing unit. The multithreaded processing unit is configured to perform the steps of fetching a program instruction, determining that the program instruction is a branch instruction, determining that the program instruction is not a return or break instruction, determining whether the program instruction includes a set-synchronization bit, and updating an active program counter, where the manner in which the active program counter is updated depends on a branch instruction type.

18 Claims, 9 Drawing Sheets

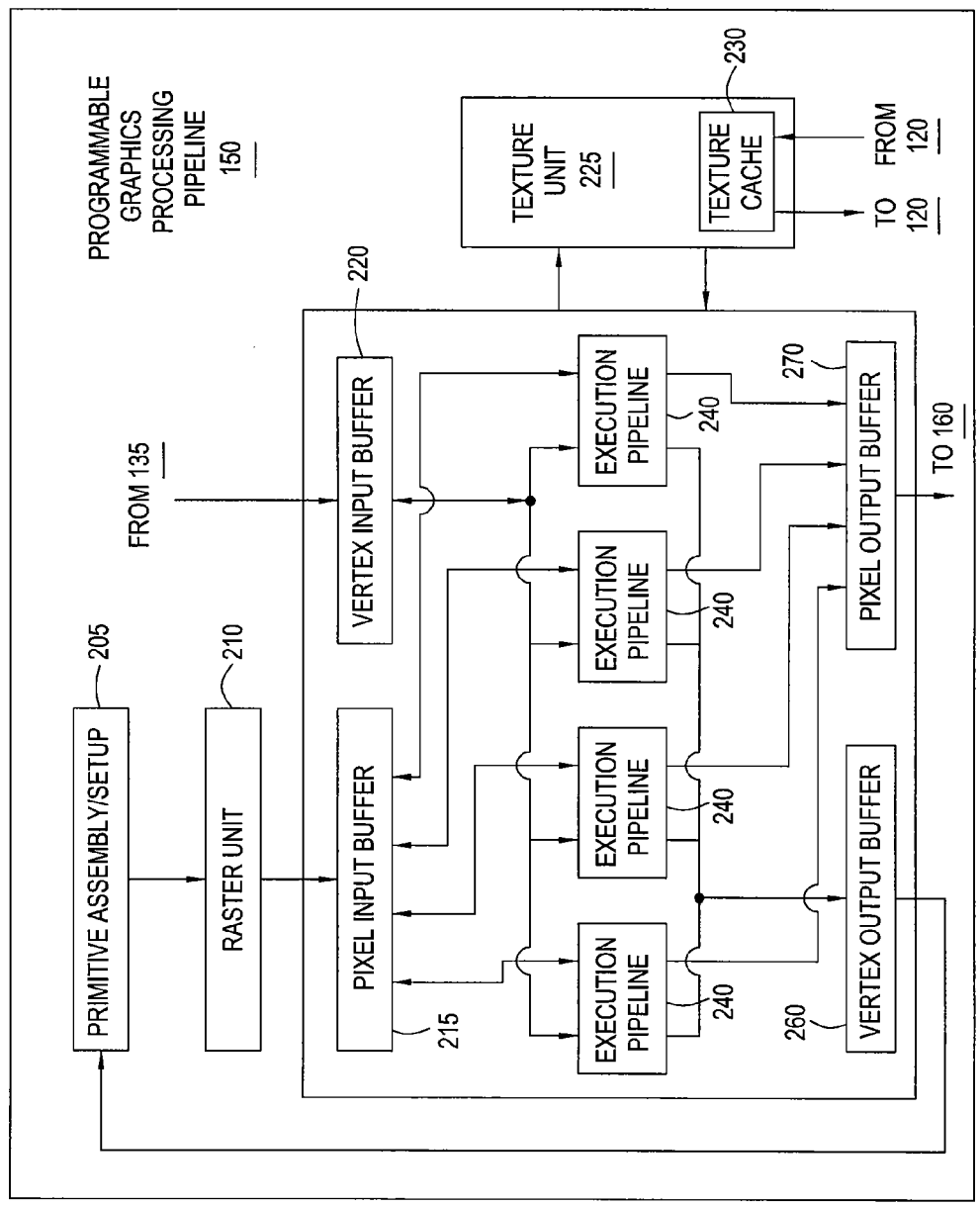

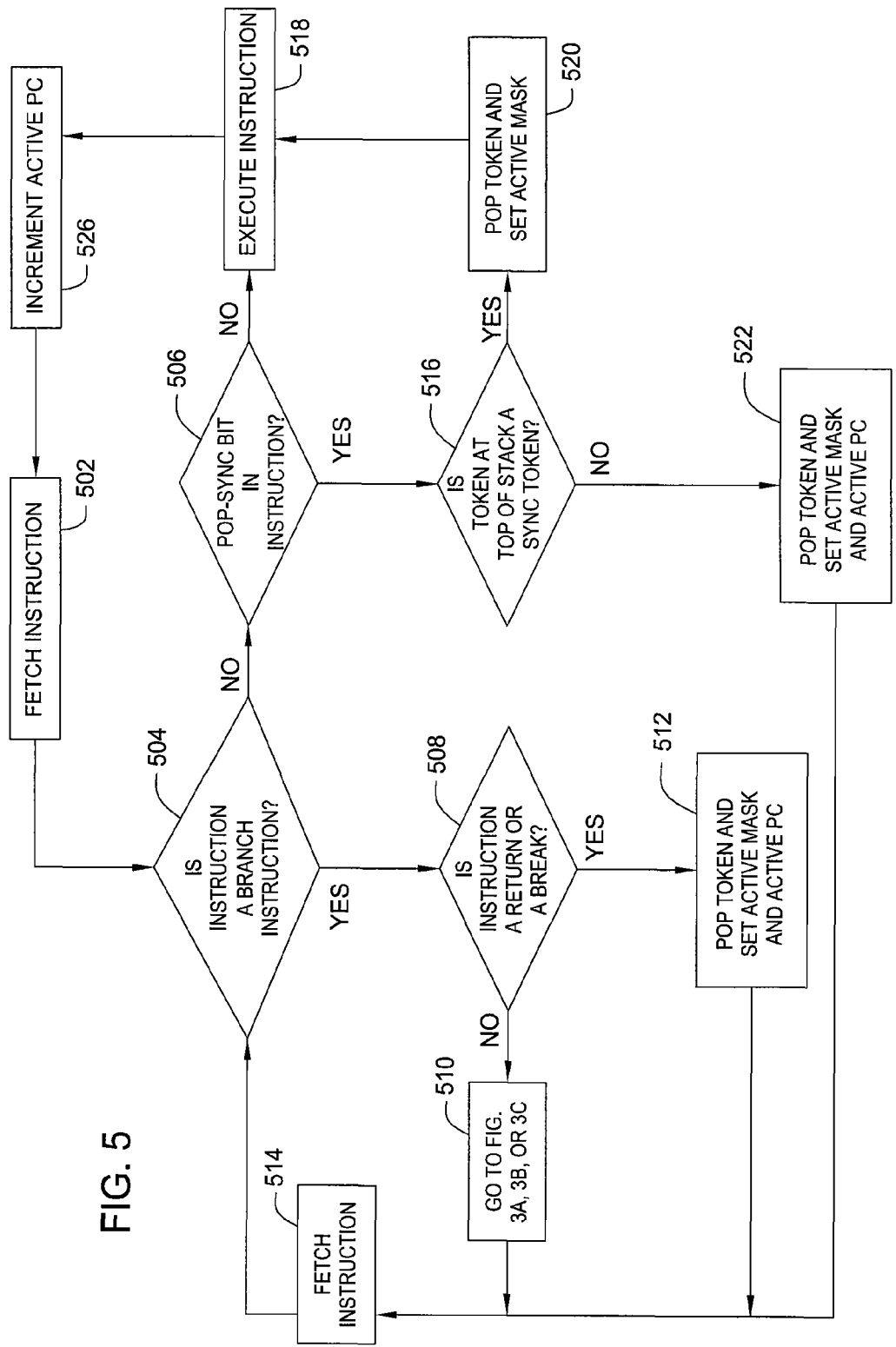

ASSEMBLY PSEUDO-CODE

| PC | LABEL | INSTRUCTION | |
|---|---|---|---|
| 0 | | fcmp | R0,R1 |
| 1 | | bra.s | ne, ELSE |
| 2 | | fadd | R0,R0 1 |
| 3 | | bra | ENDIF |
| 4 | ELSE: | call | UPDATE |
| 5 | | fadd | R0,R0,2 |
| 6 | ENDIF: | fsub.s | R0,R1,R0 |
| | | | |
| 10 | UPDATE: | fmul | R1,R1,R0 |
| 11 | | ret | |

C PSEUDO-CODE

```
if ( R0 == R1 ) {
    R0 = R0 + 1;
} else {
    Update( ) ;
    R0 = R0 + 2;
}
R0 = R1 - R0;

void Update( ) {
    R1 = R1 * R0;
    return;
}
```

FIG. 6C

SYSTEMS AND METHOD FOR MANAGING DIVERGENT THREADS IN A SIMD ARCHITECTURE

CROSS-REFERENCE TO RELATED APPLICATIONS

This application is a continuation of U.S. patent application Ser. No. 11/180,499 entitled, "SYSTEM AND METHOD FOR MANAGING DIVERGENT THREADS USING SYNCHRONIZATION TOKENS AND PROGRAM INSTRUCTIONS THAT INCLUDE SET-SYNCHRONIZATION BITS," filed Jul. 13, 2005. The subject matter of this related application is hereby incorporated herein by reference.

FIELD OF THE INVENTION

The present invention generally relates to graphics processing and more specifically to a system and method for managing divergent threads in a single-instruction, multiple-data ("SIMD") architecture.

BACKGROUND

Current graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process in parallel as much graphics data as possible throughout the different parts of the graphics pipeline. Graphics processors with SIMD architectures are designed to maximize the amount of parallel processing in the graphics pipeline. In a SIMD architecture, the various threads attempt to execute program instructions synchronously as often as possible to increase processing efficiency.

A problem typically arises, however, when the program includes branches, and some threads want to execute the branch, but others do not. In some prior art systems, all threads are dragged through each branch, regardless of whether the threads execute the instructions associated with that branch. Given that system may execute upwards of 800 threads, such a design is quite inefficient since hundreds of threads may be needlessly dragged through a branch. Other prior art systems disable all threads that do not execute a branch. Again, such a design is inefficient since hundreds of threads may be disabled while the branch is executed.

Accordingly, what is needed in the art is a more efficient branching algorithm for systems with SIMD architectures.

SUMMARY

One embodiment of a computing system configured to manage divergent threads in a thread group includes a stack configured to store at least one token and a multithreaded processing unit. The multithreaded processing unit is configured to perform the steps of fetching a program instruction, determining that the program instruction is a branch instruction, determining that the program instruction is not a return or break instruction, determining whether the program instruction includes a set-synchronization bit, and updating an active program counter, where the manner in which the active program counter is updated depends on a branch instruction type.

One advantage of the disclosed system is that it enables threads in a multithreaded architecture to be broken into several thread groups, where the number of threads in each group is based on the size of an active mask. When a branch in a program is encountered, each thread group is able to traverse the branch independently of the other thread groups. Thus, the thread groups that do not execute a branch do not have to be disabled while the branch is being executed. Further, the disclosed system provides an efficient mechanism for managing thread divergences within a particular thread group when that thread group executes one or more branches in a program. The result is a system that operates in full SIMD mode when possible and suffers only minimal performance degradation when thread divergences occur within a particular thread group as a branch is executed.

BRIEF DESCRIPTION OF THE DRAWINGS

FIG. 2 is a block diagram illustrating the programmable graphics processing pipeline of FIG. 1, according to one embodiment of the present invention;

FIG. 5 is a flow diagram of methods steps for processing a series of program instructions, according to one embodiment of the present invention;

FIG. 6A is a set of program instructions for illustrating one or more aspects of the present invention;

FIG. 6C sets forth the pseudo-code for the program instructions of FIG. 6A.

DETAILED DESCRIPTION

Figure 1:
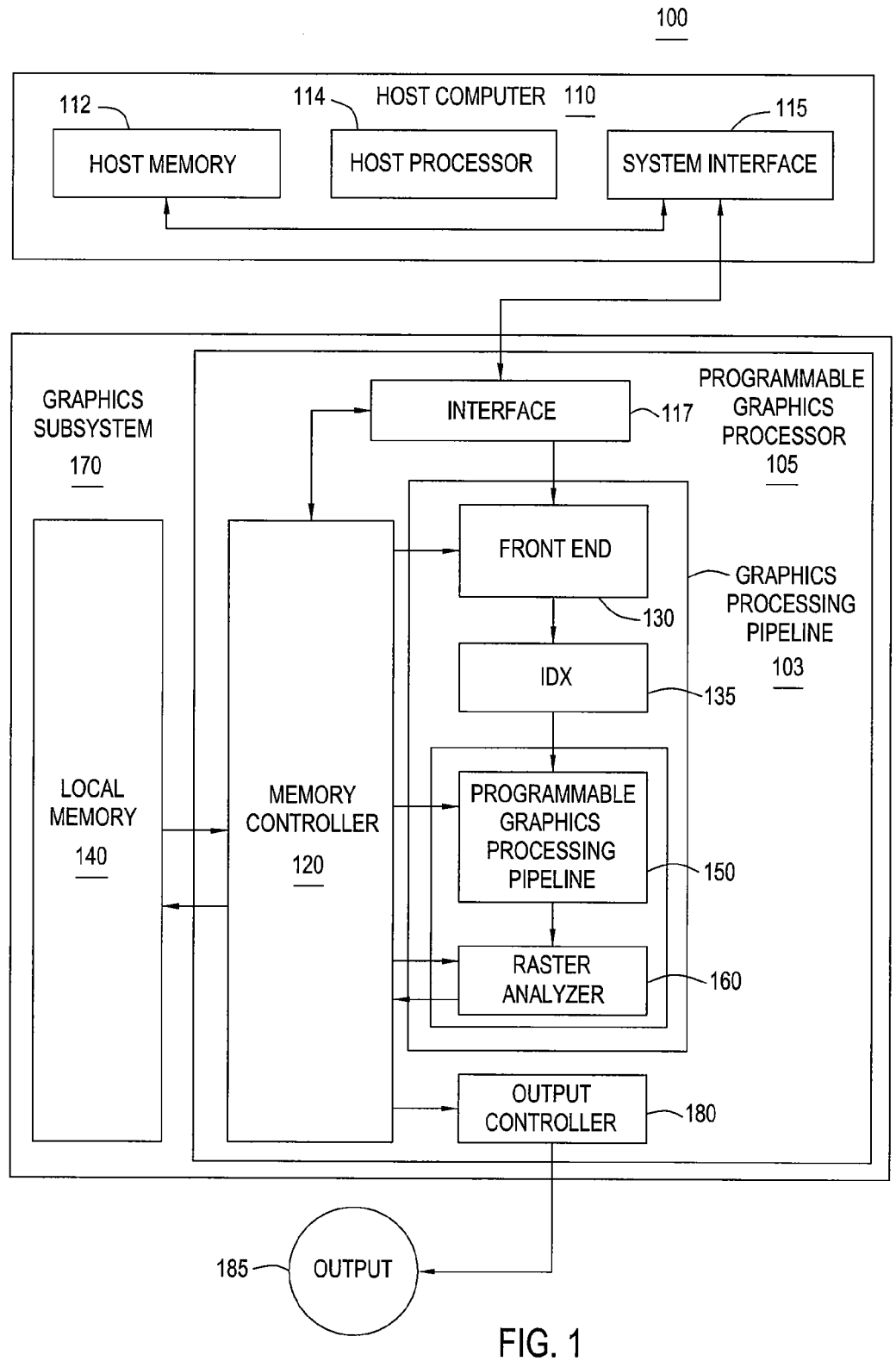
FIG. 1 is a block diagram illustrating a computing system configured to implement one or more aspects of the present invention.

FIG. 1 is a block diagram illustrating a computing system 100 configured to implement one or more aspects of the present invention. As shown, computer system 100 may include, without limitation, a host computer 110 and a graphics subsystem 170. Computing system 100 may be a desktop computer, server, laptop computer, palm-sized computer, tablet computer, game console, cellular telephone, computer based simulator or the like. Host computer 110 includes a host processor 114, which may include a system memory controller to interface directly to a host memory 112 or may communicate with host memory 112 through a system interface 115. System interface 115 may be an input/output (I/O) interface or a bridge device including the system memory controller to interface directly to host memory 112. Examples of system interface 115 known in the art include Intel® Northbridge.

Host computer 110 communicates with graphics subsystem 170 via system interface 115 and an interface 117. Graphics subsystem 170 includes a local memory 140 and a programmable graphics processor 105. Data received at interface 117 can be passed to a front end 130 or written to local memory 140 through a memory controller 120. Programmable graphics processor 105 uses graphics memory to store graphics data and program instructions, where graphics data is any data that is input to or output from computation units within programmable graphics processor 105. Graphics memory can include portions of host memory 112, local memory 140 directly coupled to programmable graphics processor 105, register files coupled to the computation units within programmable graphics processor 105 and the like.

Graphics processing pipeline 103 may include, without limitation, front end 130 that receives commands from host computer 110 via interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. Each of IDX 135, programmable graphics processing pipeline 150 and a raster operations unit 160 includes an interface to memory controller 120 through which program instructions and data can be read from memory, e.g., any combination of local memory 140 and host memory 112. When a portion of host memory 112 is used to store program instructions and data, that portion of host memory 112 can be uncached, increasing the access performance of graphics processor 105.

IDX 135 optionally reads processed data, e.g., data written by raster operations unit 160, from memory and outputs the data, processed data and formatted commands to programmable graphics processing pipeline 150. Each of programmable graphics processing pipeline 150 and raster operations unit 160 includes one or more programmable processing units for performing a variety of specialized functions. Such functions, without limitation, include table lookup, scalar and vector addition, multiplication, division, coordinate-system mapping, calculation of vector normals, tessellation, calculation of derivatives, interpolation and the like. Programmable graphics processing pipeline 150 and raster operations unit 160 are each optionally configured such that data processing operations are performed in multiple passes through those units or in multiple passes within programmable graphics processing pipeline 150. Each of programmable graphics processing pipeline 150 and raster operations unit 160 also includes a write interface to memory controller 120 through which data can be written to memory.

In a typical implementation, programmable graphics processing pipeline 150 performs geometry computations, rasterization and pixel computations. Therefore programmable graphics processing pipeline 150 may thus be programmed to operate on surface, primitive, vertex, fragment, pixel, sample or any other data. Again, for simplicity, the term "samples" is hereinafter used to refer to surfaces, primitives, vertices, pixels or fragments of the like.

Samples output by programmable graphics processing pipeline 150 are passed to a raster operations unit 160, which optionally performs near and far plane clipping and raster operations, such as stencil, z test and the like, and saves the results or the samples output by programmable graphics processing pipeline 150 in local memory 140. When the data received by graphics subsystem 170 has been completely processed by graphics processor 105, an output 185 of graphics subsystem 170 is provided using an output controller 180. Output controller 180 is optionally configured to deliver data to a display device, network, electronic control system, other computing systems 100, other graphics subsystems 170 or the like.

FIG. 2 is a block diagram illustrating programmable graphics processing pipeline 150 of FIG. 1, according to one embodiment of the invention. At least one set of samples is output by IDX 135 and received by programmable graphics processing pipeline 150. The samples are then processed according to at least one program that includes graphics program instructions. A program can process one or more sets of samples. Conversely, a set of samples can be processed by a sequence of one or more programs.

The samples received from IDX 135 by programmable graphics processing pipeline 150 are stored in a vertex input Buffer 220 in a register file, FIFO (first-in first-out) stack, cache or the like. The samples are broadcast to one or more execution pipelines 240, each on which includes at least one multithreaded processing unit (not shown). The samples output by vertex input buffer 220 can be processed by any one of the execution pipelines 240. A sample is accepted by execution pipeline 240 when a thread within execution pipeline 240 is available. Each execution pipeline 240 signals to vertex input buffer 220 when a thread is available, thereby indicating that a sample can be accepted. In one embodiment, programmable graphics processing pipeline 150 includes a single execution pipeline 240 containing one multithreaded processing unit. In an alternative embodiment, programmable graphics processing pipeline 150 may include a plurality of execution pipelines 240.

Execution pipeline 240 can receive first samples, such as higher-order surface data, and tessellate the first samples to generate second samples, such as vertices. Execution pipeline 240 can be configured to transform the second samples from an object-based coordinate representation (object space) to an alternatively based coordinate system such as world space or normalized device coordinates (NDC) space. In one embodiment, each execution pipeline 240 communicates with texture unit 225 using a read interface (not shown) to read program instructions and graphics data such as texture maps from local memory 140 or host memory 112 via memory controller 120 and a texture cache 230. Texture cache 230 is used to improve memory read performance by reducing read latency, but may be omitted in an alternative embodiment. In another alternate embodiment, texture unit 225 may be included in each execution pipeline 240. In yet another alternative embodiment, a separate instruction fetch path may be used by each execution pipeline 240 to retrieve program instructions and graphics data. Persons skilled in the art will recognize that the manner in which execution pipeline 240 retrieve program instructions and graphics data in no way limits the scope of the present invention.

Execution pipelines 240 output processed samples, such as vertices, that are stored in a vertex output buffer 260 in a register file, FIFO, cache or the like. Processed vertices output by vertex output buffer 260 are received by a primitive assembly/setup 205, which calculates parameters, such as deltas and slopes, to rasterize the processed vertices. Primitive assembly/setup 205 outputs parameters and samples, such as vertices, to a raster unit 210, which performs scan conversion on samples, such as vertices, and outputs samples, such as fragments, to a pixel input buffer 215. Alternatively, raster unit 210 resamples processed vertices and outputs additional vertices to pixel input buffer 215.

Pixel input buffer 215 outputs the samples to each execution pipeline 240. Each sample output by pixel input buffer 215 is processed by only one execution pipelines 240. Pixel input buffer 215 determines to which one of execution pipelines 240 to output a particular sample based on an output pixel position, e.g., (x, y), associated with that sample. Thus, each sample may be output to execution pipeline 240 designated to process samples associated with a given output pixel position. In an alternate embodiment, each sample output by pixel input buffer 215 may be processed by an available execution pipeline 240.

As previously mentioned herein, a sample is accepted by execution pipeline 240 when a thread within execution pipeline 240 is available. Program instructions associated with a thread configure programmable computation units (not shown) within execution pipeline 240 to perform operations such as texture mapping, shading, blending and the like. Processed samples are output from each execution pipeline 240 to a pixel output buffer 270. Pixel output buffer 270 optionally stores the processed samples in a register file, FIFO, cache or the like. The processed samples are output from pixel output buffer 270 to raster operations unit 160.

In one embodiment, execution pipelines 240 are optionally configured using program instructions read by texture unit 225 such that data processing operations are performed in multiple passes through at least one multithreaded processing unit disposed within execution pipelines 240. Intermediate data generated during multiple passes can be stored in graphics memory. Again, the manner in which execution pipeline 240 retrieves program instructions in no way limits the scope of the present invention.

One characteristic of the system disclosed in FIGS. 1 and 2 is that it may be configured to embody a SIMD architecture, where a thread is assigned to each sample processed in the one or more execution pipelines 240. When operating in a synchronized mode, each thread in a particular multi-threaded processing unit independently and simultaneously executes the same operations (or instructions) on its respective sample. This type of synchronized processing is advantageous because, among other things, it allows groups of like samples to be processed simultaneously, which increases graphics processing efficiency. However, there are points in a program (i.e., branches) where threads in a thread group are allowed to "diverge" from one another so that one or more threads may execute instructions on their respective samples that do not need to be executed by the other threads in the thread group. FIGS. 3A-6C describe a system and method that may be implemented to manage thread divergences that may occur when a thread group encounters one or more branches in a program.

In particular, the disclosed system and method enable divergence and flow control information to be stored and accessed in a way that precludes this information from being overwritten, regardless of the number of thread divergences that occur or the number of nested conditions that exist in a program. The actual number of divergences and nesting levels that can be supported is, of course, limited by the size of the memory stack used to store the divergence and flow control information (which is described in further detail below) as well as the SIMD width of the particular thread group. Regardless of the size of the memory stack, however, the system and method are robust. For example, a driver or compiler may be configured to ensure that the stack depth is not exceeded for a particular program, thereby avoiding problems related to memory stack size limitations.

The disclosed system and method also enable divergent threads to be synchronized at various points in the program to guarantee that some level of synchronized processing may be achieved at those points.

In one embodiment, system 100 may be configured to simultaneously process twenty-four independent thread groups. In one embodiment, each thread group may include up to thirty-two threads. A particular multithreaded processing unit within execution pipeline 240 may process one or more such thread groups. The multithreaded processing unit is configured to maintain an active mask and an active program counter for each of the thread groups it processes. The active mask is a string of bits that indicates which threads in the thread group are currently active (i.e., currently executing instructions). Each bit in the active mask corresponds to one thread in the thread group. In one embodiment, a bit is set if its corresponding thread is active. Thus, when all bits in the active mask are set, the multithreaded processing unit is operating in fully synchronized mode. The active program counter indicates the address of the instruction in the program currently being executed by the active threads.

As the multithreaded processing unit processes instructions in the program, it may encounter one or more branch instructions. As described in further detail below in conjunction with FIGS. 3A-3C, when a branch instruction is encountered, the multithreaded processing unit pushes a token onto a memory stack. Each such token includes state information related to various threads in the thread group. The specific state information included in a token depends on the type of branch instruction encountered. After pushing the token onto the stack, the multithreaded processing unit may disable certain threads in the thread group, while keeping the other threads active. The active threads then execute the instructions associated with the branch. Again, the type of branch instruction encountered determines which threads, if any, in the thread group are disabled and which threads remain active.

FIG. 5 describes how the multithreaded processing unit processes program instructions in accordance with one or more aspects of the present invention. In particular this figure describes how the multithreaded processing unit pushes and pops different tokens onto and from the memory stack as the different program instructions, including branch instructions, are processed to ensure that the different program instructions are executed by the appropriate threads.

In addition, since thread divergences may occur when branches are encountered, synchronizing the threads after executing one or more branches oftentimes is desirable, especially in SIMD systems, to reestablish the level of synchronized processing that existed before the branches were encountered. Synchronization tokens are used for this synchronization function.

More specifically, when a branch instruction is encountered, the multithreaded processing unit also determines whether the branch instruction includes a set-synchronization bit (also called a "set-sync bit"). A set-synchronization bit indicates that a thread divergence may occur due to the branch. If the branch instruction includes a set-synchronization bit, the multithreaded processing unit pushes a synchronization token onto the stack before processing the branch instruction. The synchronization token includes state information related to the threads that were active when the branch instruction was first encountered. As described in further detail below in conjunction with FIG. 5, when a synchronization token is popped from the stack, the threads that were active when the branch instruction was first encountered are synchronized.

The memory stack is a storage mechanism that operates in a last-in, first-out fashion and comprises a logical collection of hardware-managed sixty-four bit tokens, which are described in further detail below in conjunction with FIG. 4. One independent stack is associated with one thread group. As will become apparent in the descriptions of FIGS. 5 and 6 the stack is populated with tokens (i.e., tokens are pushed onto the stack) and unwound (i.e., tokens are popped from the stack) in a way that precludes any token from being overwritten, regardless of the number of divergences that occur or the number of nesting levels that exist in the program. Further, the operation of the stack in combination with the information included in the different types of tokens provide an efficient mechanism for executing the various instructions in a program having several branches and for synchronizing threads as they navigate the different branches of that program.

Figure 3A:
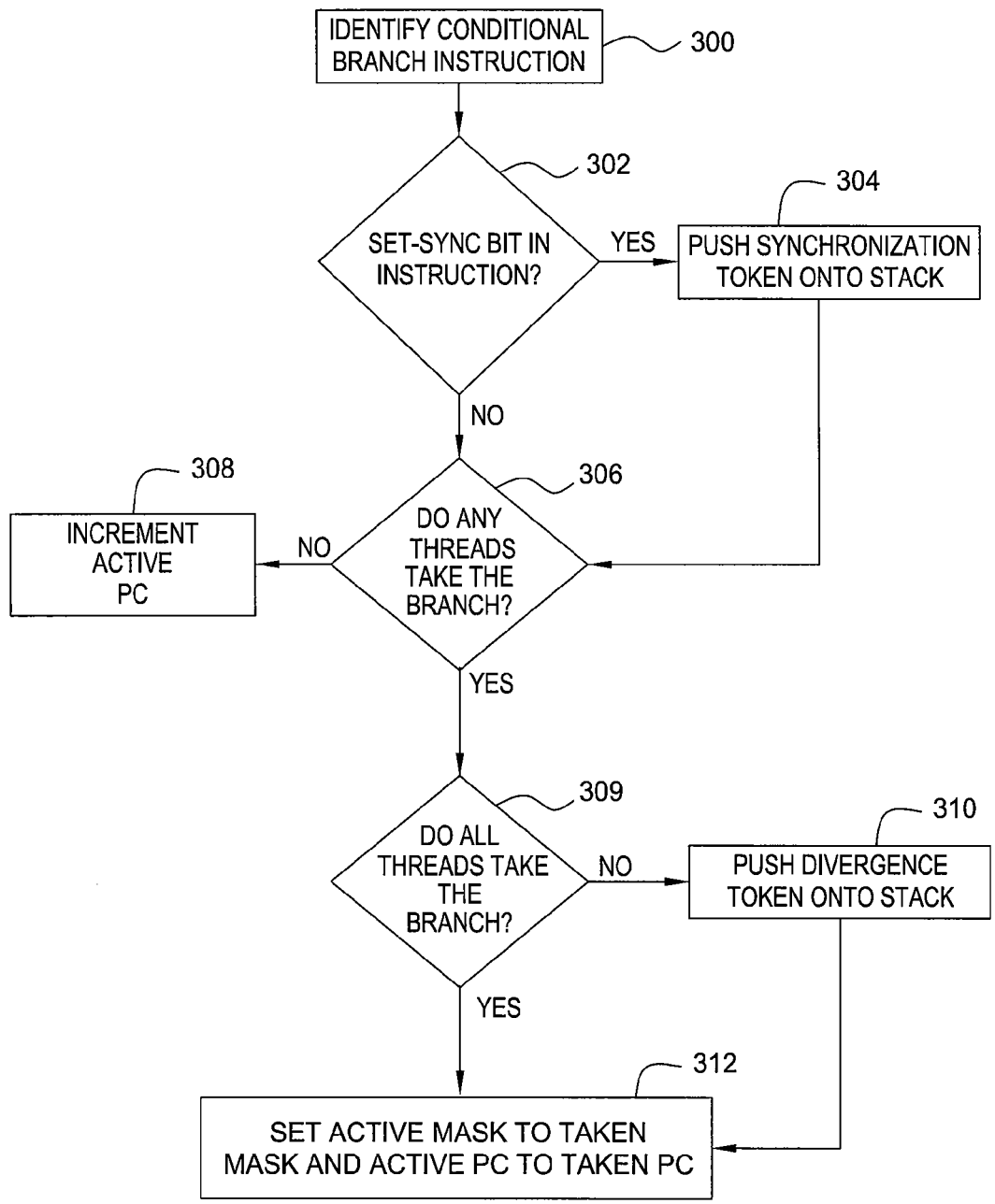
FIG. 3A is a flow diagram of method steps for managing a group of active threads in view of a conditional branch, according to one embodiment of the present invention.

FIG. 3A is a flow diagram of method steps for managing a group of active threads in view of a conditional branch, according to one embodiment of the present invention. Persons skilled in the art will understand that any system configured to perform the method steps, in any order, is within the scope of the present invention.

As is well-known, when a conditional branch instruction, such as an if-statement, is written in the C programming language and then translated into assembly code, the condition included in the C-code version of the if-statement is inverted (hereinafter referred to as the "inverted condition"). Therefore, for purposes of discussion only, the "else-side" of a conditional branch refers to the instructions executed when the inverted condition included in the translated conditional branch instruction is satisfied. As described in further detail below, the else-side is deemed to be the "taken" path and is executed first. By contrast, the "if-side" of a conditional branch refers to the instructions that are executed when the inverted condition included in the translated conditional branch instruction is not satisfied. The if-side is deemed to be the "not-taken" path and is executed second.

Neither this convention nor the related terminology modifies or limits the scope of the present invention in any way. For example, in alternative embodiments, the conditional branch instruction may be written such that the C-code and the assembly code use the same condition. In such embodiments, the order of the two conditional paths is switched such that the if-side of the conditional branch becomes the taken path and is executed first, and the else-side becomes the not-taken path and is executed second. Thus, the if-side of the conditional branch is executed when the condition included in the branch instruction is satisfied, and the else-side is executed when the condition included in the branch instruction is not satisfied.

The method begins in step 300, where the multithreaded processing unit identifies a conditional branch instruction in the program. In step 302, the multithreaded processing unit determines whether the conditional branch instruction includes a set-synchronization bit. If the instruction does not include a set-synchronization bit, then the method proceeds to step 306.

In step 306, the multithreaded processing unit determines whether any threads in the group of active threads "take" the branch associated with the conditional branch instruction. As described above, in one embodiment, the branch is "taken" by an active thread if the inverted condition included in the conditional branch instruction is satisfied for that thread. Thus, a thread that "takes" the branch executes the else-side of the conditional branch. The else-side of the conditional branch, therefore, is referred to as the "taken" path. If, in step 306, the multithreaded processing unit determines that none of the active threads takes the branch (i.e., the inverted condition is not satisfied for any of the active threads), then no thread divergence occurs and the method proceeds to step 308. In step 308, the multithreaded processing unit increments the active program counter to allow the active threads to execute the next program instruction.

If, in step 306, the multithreaded processing unit determines that at least one active thread takes the branch (i.e., the inverted condition is satisfied for at least one thread), then the method proceeds to step 309, where the multithreaded processing unit determines whether all of the threads in group of active threads take the branch. Again, all of the active threads take the branch only if the inverted condition associated with the conditional branch instruction is satisfied for all of the active threads. If some but not all of the active threads take the branch, then a thread divergence occurs, and the method proceeds to step 310. In step 310, the multithreaded processing unit pushes a divergence token onto the stack. The divergence token includes state information about the threads that do not take the branch (i.e., the threads for which the inverted condition is not satisfied). Specifically, the divergence token includes a "not-taken" mask and a "not-taken" program counter. The not-taken mask indicates which threads in the original group of active threads do not branch to the instructions associated with the else-side of the conditional branch. Again, in one embodiment, these threads executed the if-side of the conditional branch. Thus, as described above, the if-side of the conditional branch is referred to as the "not-taken" path. In one embodiment, the not-taken mask includes a set bit corresponding to each such thread. The not-taken program counter indicates the address of the first instruction associated with the if-side of the conditional branch (also referred to as the "fall-through" instruction).

After the divergence token is pushed onto the stack, in step 312, the multithreaded processing unit sets the active mask to the "taken" mask and the active program counter to the "taken" program counter. The taken mask indicates which threads in the original group of active threads execute the instructions associated with the else-side of the conditional branch. As previously discussed herein, these threads branch to the instructions associated with the else-side of the conditional branch. In one embodiment, the taken mask mirrors the not-taken mask and includes a set bit corresponding to each such thread. Setting the active mask to the taken mask in step 312 has the effect of activating the threads that execute the else-side of the conditional branch, while disabling the threads that execute the if-side of the conditional branch. The taken program counter indicates the address of the first instruction associated with the else-side of the conditional branch. Thus, setting the active program counter to the taken program counter stipulates that the active threads (i.e., the threads executing the else-side of the conditional branch) execute this first instruction.

If, in step 309, the multithreaded processing unit determines that all of the active threads take the branch (i.e., the inverted condition is satisfied for all of the threads), then no thread divergence occurs. The method then proceeds to step 312, where the multithreaded processing unit sets the active mask equal to the taken mask and the active program counter to the taken program counter. This process enables all of the threads in the original group of active threads to execute the else-side of the conditional branch.

Referring back to step 302, if the multithreaded processing unit determines that the conditional branch instruction includes a set-synchronization bit, then the method proceeds to step 304, where a synchronization token is pushed onto the stack. As previously described, a synchronization token is used to synchronize threads that were active when a branch instruction was originally encountered once those threads have completed executing that branch. The synchronization token therefore includes an active mask indicating the threads that were active when the branch instruction having the set-synchronization bit was encountered. Effectively, the synchronization token allows the multithreaded processing unit to gather threads that may have diverged while executing the branch associated with the synchronization bit until all of the threads that were active when the synchronization bit was encountered have been reassembled. When the assembled threads reflect the active mask in the synchronization token, the group of threads that were active when the synchronization bit was initially encountered are synchronized. After the synchronization token is pushed onto the stack, the method proceeds to step 306, previously described herein.

Table 1 includes pseudo code for a set of instructions that may be used to implement the method of FIG. 3A.

TABLE 1

```
sub BRA {
    if (set_sync)
        push (ID_SYNC, active_mask);
    if (threads_diverge_here) {
        push (ID_DIVERGE, not_taken_mask, not_taken_pc);
        active_mask = taken_mask;
        active_pc = taken_pc;
    }
}
```

Figure 3B:
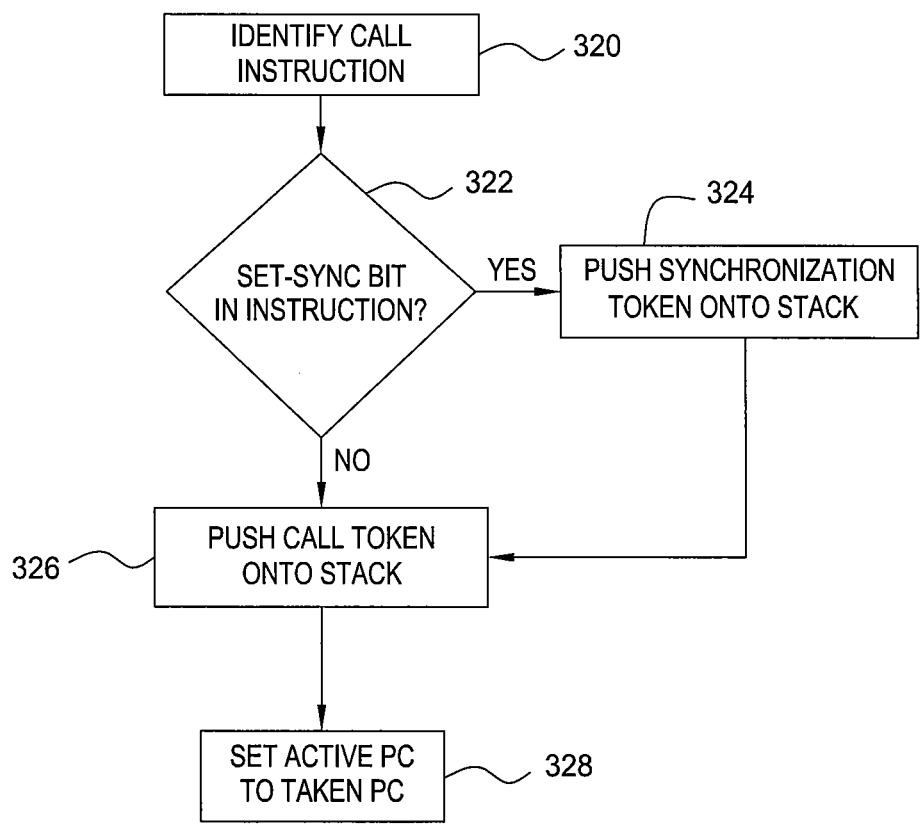
FIG. 3B is a flow diagram of method steps for managing a group of active threads in view of a call instruction, according to one embodiment of the present invention.

FIG. 3B is a flow diagram of method steps for managing a group of active threads in view of a call instruction, according to one embodiment of the present invention. Persons skilled in the art will understand that any system configured to perform the method steps, in any order, is within the scope of the present invention.

The method begins in step 320, where the multithreaded processing unit identifies a call instruction in the program. In step 322, the multithreaded processing unit determines whether the call instruction includes a set-synchronization bit. If the call instruction does not include a set-synchronization bit, then the method proceeds to step 326.

In step 326, a call token is pushed onto the stack that includes state information about the threads that execute the call/return branch as well as return address information. Specifically, the call token includes an active mask and a "return" program counter. The active mask indicates which threads are active when the call instruction is encountered. Because call instructions are not conditional, there are no thread divergences associated with a call/return branch. Thus, the active mask included in the call token also indicates which threads execute the call/return branch. The return program counter provides a return address for the threads that execute the call/return branch and reflects the address of the instruction in the program subsequent to the call instruction (i.e., the fall-through instruction).

After pushing the call token onto the stack, the method proceeds to step 328, where the active program counter is set to the "taken" program counter. The taken program counter indicates the address of the first instruction of the subroutine associated with the call/return branch. Thus, setting the active program counter to the taken program counter stipulates that the active threads (i.e., all of the threads that are active when the call instruction is encountered) execute this first instruction.

If, in step 322, the multithreaded processing unit determines that the call instruction includes a set-synchronization token, then the method proceeds to step 324, where a synchronization token is pushed onto the stack, as described above in conjunction with FIG. 3A. After the synchronization token is pushed onto the stack, the method proceeds to step 326, previously described herein.

Table 2 includes pseudo code for a set of instructions that may be used to implement the method of FIG. 3B.

TABLE 2

```
sub CALL {
    if (set_sync)
        push (ID_SYNC, active_mask);
    push (ID_CALL, active_mask, return_pc);
    active_pc = taken_pc;
}
```

Figure 3C:
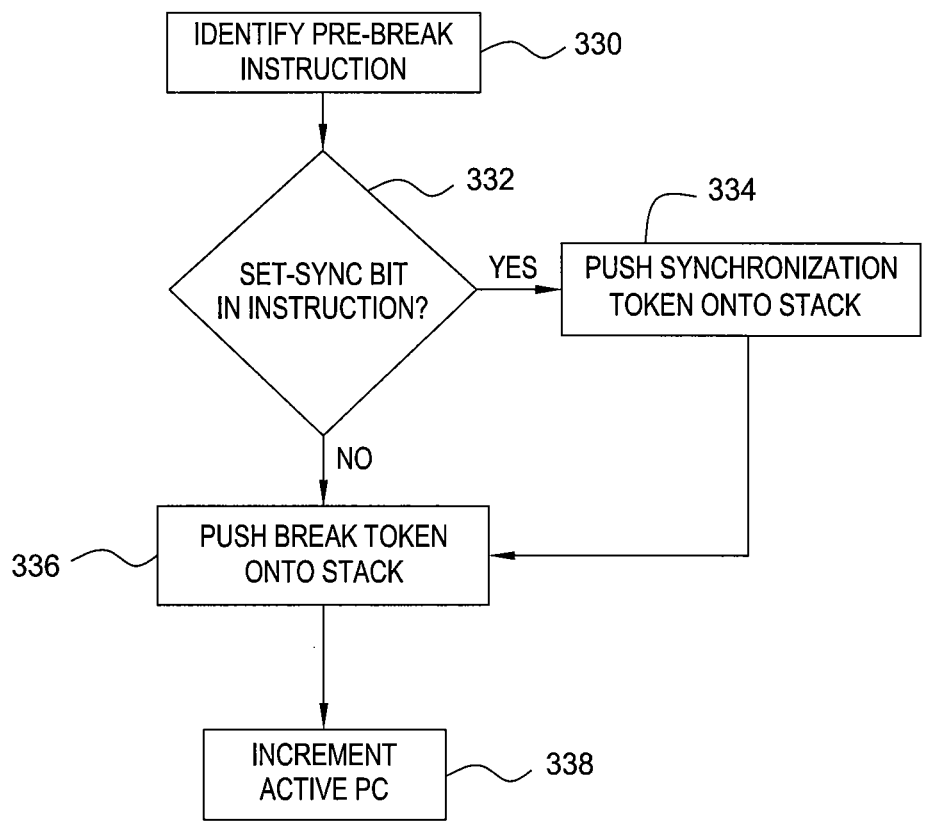
FIG. 3C is a flow diagram of method steps for managing a group of active threads in view of a PreBreak instruction, according to one embodiment of the present invention.

FIG. 3C is a flow diagram of method steps for managing a group of active threads in view of a PreBreak instruction, according to one embodiment of the present invention. Persons skilled in the art will understand that any system configured to perform the method steps, in any order, is within the scope of the present invention.

The method begins in step 330, where the multithreaded processing unit identifies a PreBreak instruction. In step 332, the multithreaded processing unit determines whether the PreBreak instruction includes a set-synchronization bit. If the PreBreak instruction does not include a set-synchronization bit, then the method proceeds to step 336.

In step 336, a break token is pushed onto the stack that includes state information about the threads that execute the PreBreak branch as well as after-loop address information. Specifically, the break token includes an active mask and an "after-loop" program counter. Similar to call instructions, PreBreak instructions are not conditional. Therefore, the active mask included in the break token not only indicates the threads that are active when the PreBreak instruction is encountered, but also the threads that execute the PreBreak branch. The after-loop program counter reflects the address of the instruction that the threads execute after executing the instructions associated with the PreBreak branch.

After pushing the break token onto the stack, the method proceeds to step 338, where the active program counter is incremented. A PreBreak branch enables a specific loop of instructions to be executed. In the program, the first instruction in this loop typically follows the PreBreak instruction (i.e., the first instruction in the loop is the fall-through instruction). Therefore, the threads executing the PreBreak branch do not have to branch to a specific instruction to execute the loop of instructions, as is necessary with conditional branches and call/return branches. Rather, the threads simply execute the next instruction in the program to begin executing the loop in the PreBreak branch. Thus, incrementing the active program counter to reflect the next instruction in the program effectively stipulates that the active threads (i.e., all of the threads that are active when the PreBreak instruction is encountered) execute the first instruction of this loop.

If, in step 332, the multithreaded processing unit determines that the PreBreak instruction includes a set-synchronization token, then the method proceeds to step 334, where a synchronization token is pushed onto the stack, as described above in conjunction with FIG. 3A. After the synchronization token is pushed onto the stack, the method proceeds to step 336, previously described herein.

Table 3 includes pseudo code for a set of instructions that may be used to implement the method of FIG. 3C.

TABLE 3

```
sub PREBRK {
    if (set_sync)
        push (ID_SYNC, active_mask);
    push (ID_BREAK, active_mask, after_loop_pc);
}
```

Table 4 illustrates the different types of tokens pushed onto the stack in relation to the different types of branch instructions that may appear in a program. Also shown is the state information associated with each type of token.

TABLE 4

| Type of Instruction | Includes Set Sync Bit? | Divergence? | Token Pushed onto Stack |
|---|---|---|---|
| Conditional Branch | N | N | None |
| Conditional Branch | Y | N | Sync Token {Active Mask} |
| Conditional Branch | Y | Y | Sync Token {Active Mask} Divergence Token {Not-Taken Mask, Not-Taken PC} |
| Conditional Branch | N | Y | Divergence Token {Not-Taken Mask, Not-Taken PC} |
| Call | N | N/A | Call Token {Active Mask, Return PC} |
| Call | Y | N/A | Sync Token {Active Mask} Call Token {Active Mask, Return PC} |
| PreBreak | N | N/A | PreBreak Token {Active Mask, After-Loop PC} |
| PreBreak | Y | N/A | Sync Token {Active Mask} PreBreak Token {Active Mask, After-Loop PC} |

Figure 4:
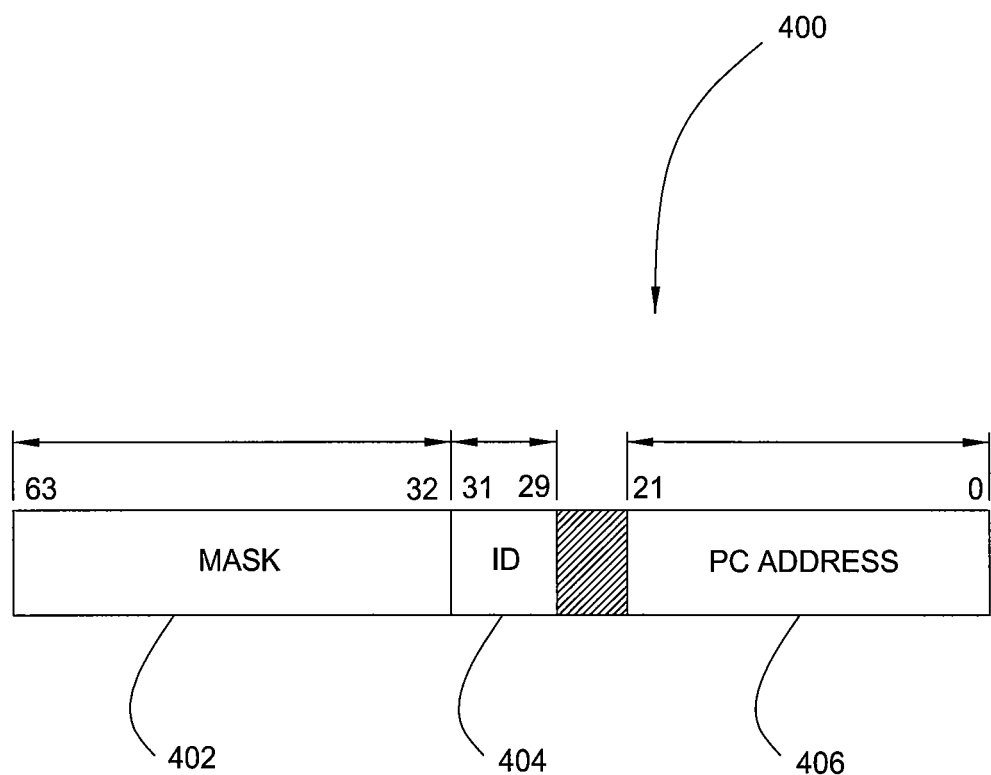
FIG. 4 illustrates a token, according to one embodiment of the present invention.

FIG. 4 illustrates a token 400, according to one embodiment of the present invention. As shown, token 400 may include, without limitation, a mask 402, a token identifier 404 and a program counter address 406. In one embodiment, mask 402 is thirty-two bits long and corresponds to the type of mask pushed onto the stack for the various types of branch instructions. For example, if the branch instruction encountered is a conditional branch and token 400 is a divergence token, then mask 402 comprises a not-taken mask. Similarly, if the branch instruction encountered is a PreBreak instruction and token 400 is a PreBreak token, then mask 402 comprises an active mask. In one embodiment, token identifier 404 is three bits long and includes and indicates the type of token that token 400 is. For example, a synchronization token may be indicated by a token identifier 404 having a value of [000] and a divergence token may be indicated by a token identifier 404 having a value of [001]. In one embodiment, program counter address 406 is twenty-two bits long and includes the instruction address associated with the different types of program counters included in token 400. For example, if token 400 is a call token, then program counter address 406 includes the return address specified in the return instruction of the call/return branch. Similarly, if token 400 is a PreBreak token, then program counter address 406 includes the target address specified in the break instruction included at the end of the loop of the PreBreak branch.

FIG. 5 is a flow diagram of methods steps for processing a series of program instructions, according to one embodiment of the present invention. Persons skilled in the art will understand that any system configured to perform the method steps, in any order, is within the scope of the present invention.

The method being in step 502, where the multithreaded processing unit fetches the program instruction corresponding to the current setting of the active program counter. In step 504, the multithreaded processing unit determines whether the instruction is a branch instruction. In one embodiment, there are five types of branch instructions: conditional branch instructions, call instructions, PreBreak instructions, return instructions and break instructions. Alternative embodiments may include more or fewer types of branch instructions as well as different types of branch instructions.

If the multithreaded processing unit determines that the instruction is a branch instruction, then the method proceeds to step 508, where the multithreaded processing unit determines whether the branch instruction is a return instruction or a break instruction. If the branch instruction is not a return or break instruction, then the method proceeds to step 510, where the branch instruction is processed in accordance with the method of either FIG. 3A, FIG. 3B or FIG. 3C, as previously described herein. Since the last step in each of these methods involves updating the active program counter, after step 510, the method proceeds to step 514, where the multithreaded processing unit fetches the program instruction corresponding to the updated setting of the active program counter. The method then returns to step 504.

If, in step 508, the multithreaded processing unit determines that the branch instruction is a return or break instruction, then the end of a subroutine associated with a call/return branch or the end of a loop of instructions associated with a PreBreak branch has been reached, and the method proceeds to step 512. In step 512, the multithreaded processing unit pops from the stack the token on the top of the stack and sets the active mask equal to the mask included in the popped token and sets the active program counter to the program counter included in the popped token.

If the branch instruction is a return instruction, then the popped token will be a call token. Referring back to Table 4, the mask included in a call token is the active mask that existed when the call/return branch was encountered, and the program counter in a call token is the return program counter. Since no threads diverge when a call/return branch is encountered, setting the active mask equal to the mask in the call token has the effect of keeping active the threads that executed the subroutine associated with the call/return branch. Setting the active program counter equal to the return program counter stipulates that the active threads return to the instruction in the program subsequent to the call instruction (i.e., the fall-through instruction).

If the branch instruction is a break instruction, then the popped token will be a break token. Referring back to Table 4, the mask included in a break token is the active mask that existed when the PreBreak branch was encountered, and the program counter in the break token is the after-loop program counter. Again, since no threads diverge when a PreBreak branch is encountered, setting the active mask equal to the mask in the break token has the effect of keeping active the threads that executed the loop of instructions associated with the PreBreak branch. Setting the active program counter to the after-loop program counter stipulates that the active threads branch to the instruction having the address designated by the after-loop program counter.

After step 512, the method proceeds to step 514, where the multithreaded processing unit fetches the program instruction corresponding to the updated setting of the active program counter. The method then returns to step 504.

Referring back now to step 504, if the multithreaded processing unit determines that the instruction fetched in step 502 is not a branch instruction, then the method proceeds to step 506. In step 506, the multithreaded processing unit determines whether the instruction includes a pop-synchronization bit. In one embodiment, this type of bit is included only in non-branch instructions; whereas a set-synchronization bit, described above in conjunction with FIGS. 3A-3C, is included only in conditional branch instructions, call instructions and PreBreak instructions (return and break instructions are not include either a set-synchronization or a pop-synchronization bit). A pop-synchronization bit has the opposite meaning of a set-synchronization bit. A pop-synchronization bit indicates that the threads that have diverged since the last synchronization token was pushed onto the stack are to be executed to the address of the instruction that includes the pop-synchronization bit. As described in further detail herein, this process reestablishes the level of thread synchronization that existed when this last synchronization token was pushed onto the stack. In other words, the process reestablishes the level of thread synchronization that existed when the last branch instruction including a set-synchronization bit was encountered. In the preferred embodiment, the synchronization operation takes place before the other operations of the carrier instruction (i.e., the instruction that includes the pop-synchronization bit). In alternative embodiments, though, the synchronization operation may be carried out using a separate instruction.

If, in step 506, the instruction does not include a pop-synchronization bit, then the method proceeds to step 518, where the multithreaded processing unit executes the instruction. In step 526, the active program counter is incremented, and the method then returns to step 502.

In step 506, however, If the instruction does include a pop-synchronization bit, then the method proceeds to step 516, where the multithreaded processing unit determines whether the token on the top of the stack is a synchronization token. If the token on the top of the stack is a synchronization token, then the method proceeds to step 520. In step 520, the multithreaded processing unit pops the synchronization token from the top of the stack and updates the active mask with the mask that is included in the synchronization token. Referring back to Table 4, the mask included in a synchronization token is the active mask that existed when the branch instruction including the set-synchronization bit corresponding to the synchronization token was encountered. Thus, setting the active mask equal to the mask included in the synchronization token, activates all of the threads that were active when that branch instruction was originally encountered. By activating these threads, the same level of thread synchronization that existed when the branch instruction was originally encountered is reestablished. The method then proceeds to step 518, where the multithreaded processing unit executes the instruction, as previously described herein.

If, in step 516, the multithreaded processing unit determines that the token on top of the stack is not a synchronization token, then the method proceeds to step 522. In step 522, the multithreaded processing unit pops the token on the top of the stack and sets the active mask to the mask included in the token and sets the active program counter to the program counter included in the token. In this step, the token popped from the stack will be a divergence token. Referring back to Table 4, the mask included in a divergence token is the not-taken mask, and the program counter included in the divergence token is the not-taken program counter. In one embodiment, setting the active mask to the not-taken mask has the effect of activating the threads that need to execute the if-side of the conditional branch associated with the divergence token, while disabling the threads that just completed executing the else-side of that branch. Setting the active program counter to the not-taken program counter stipulates that the newly activated threads execute the first instruction on the if-side of the conditional branch. This process enables the execution of the if-side of the conditional branch.

After step 522, the method proceeds to step 514, where the multithreaded processing unit fetches the program instruction corresponding to the updated setting of the active program counter. The method then returns to step 504.

Table 5 includes pseudo code for a set of instructions that may be used to implement a portion of the method of FIG. 5.

TABLE 5

```
sub SYNC {
    if (peek (ID) == ID_SYNC) {
        {active_mask} = pop( );
    } else {
        {active_mask, active_pc} = pop( );
    }
}
```

FIG. 6A is a set of program instructions for illustrating one or more aspects of the present invention. As shown, a column 604 sets forth the various program instructions in the set, and a column 602 sets forth the program counter associated with each program instruction. The program instructions are presented in assembly pseudo-code for ease of presentation.

Figure 6B:
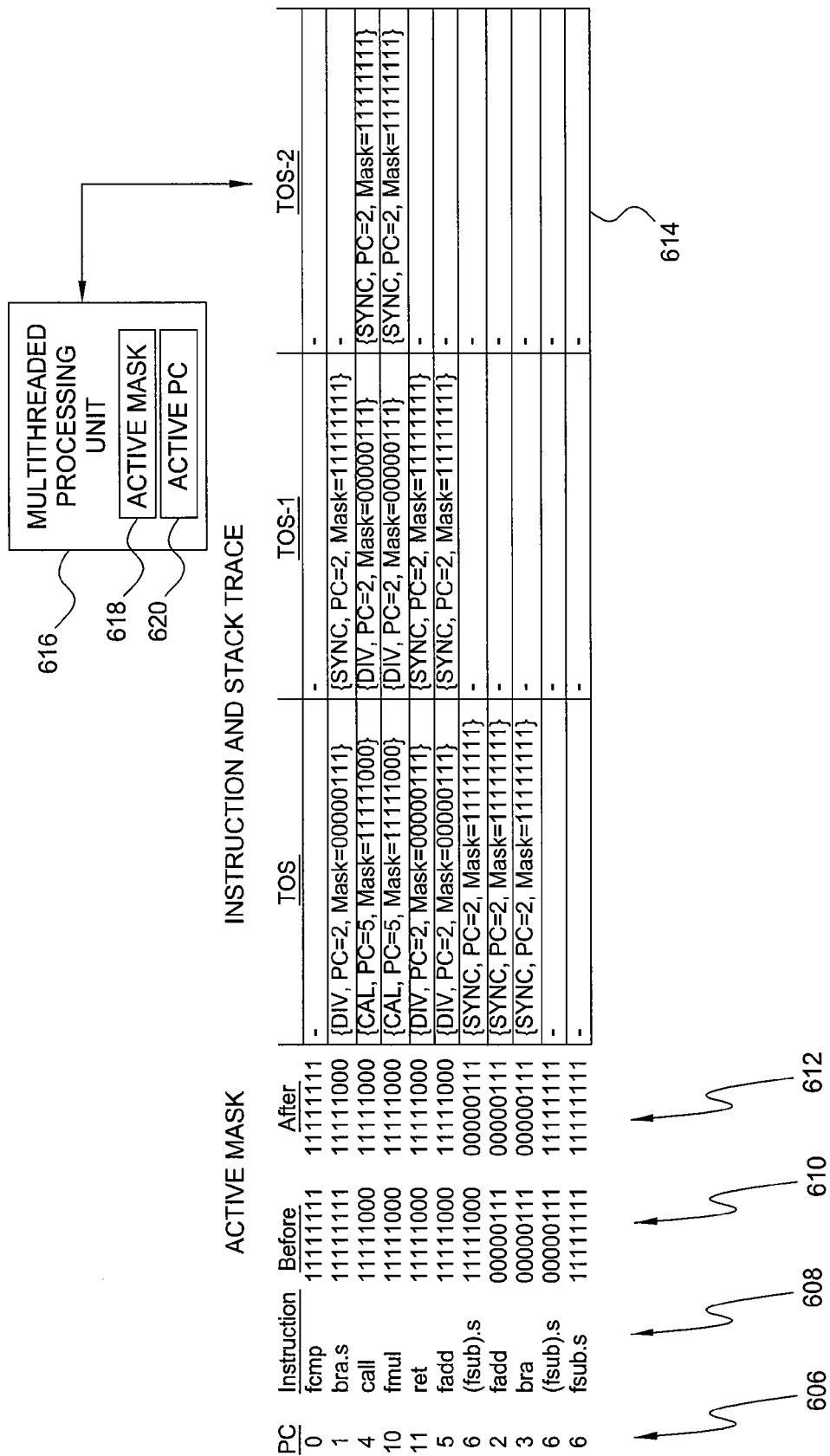
FIG. 6B is a conceptual illustration of how a stack is populated and unwound as the program instructions of FIG. 6A are executed, according to one embodiment of the present invention.

FIG. 6B is a conceptual illustration of how a stack 614 is populated and unwound as the program instructions of FIG. 6A are executed, according to one embodiment of the present invention. As shown, a column 608 sets forth the order in which a multithreaded processing unit 616 executes the program instructions, and a column 606 indicates the contents of an active program counter 620 when each such program instruction is executed. A column 610 sets forth the value of an active mask 618 before each program instruction is executed, and a column 612 sets forth the value of active mask 618 after each program instruction is executed. For purposes of discussion only, the thread group is assumed to include eight threads, and all eight threads initially are active. The initial value of active mask 618 is therefore [11111111]. Also, active program counter 620 is assumed to have an initial value of 0.

Multithreaded processing unit 616 first fetches the fcomp instruction, which corresponds to a program counter value of 0 (step 502). Since the fcomp instruction is not a branch instruction and does not include a pop-synchronization bit, multithreaded processing unit 616 executes this instruction (steps 504, 506 and 518), comparing the values of R0 and R1. Since no branch instruction was encountered, the value of active mask 618 remains [11111111].

Active program counter 620 is then incremented to a value of 1 (step 526), and multithreaded processing unit 616 fetches the bra.s instruction, which corresponds to a program counter value of 1 (step 502). The bra.s is a conditional branch instruction that includes a set-synchronization bit. As previously in conjunction with FIG. 3A, since the bra.s instruction is based on assembly code, the inverted condition (i.e., the condition included in the C-code if-statement of FIG. 6C is inverted) is used for determining the taken path and the not-taken path. Five threads are assumed to satisfy the inverted condition associated with the bra.s instruction (i.e., R0 is not equal to R1) and, thus, execute the else-side of the branch. Multithreaded processing unit 616 therefore pushes both a synchronization token and a divergence token onto stack 614 (steps 504, 508, 510, 302, 304, 306 and 310).

The mask included in the synchronization token has a value of [11111111], which reflects the value of the active mask when the bra.s instruction was encountered. The mask included in the divergence token has a value of [00000111], which is the not-taken mask and reflects the three threads that did not satisfy the condition included in the bra.s instruction. These three threads execute the if-side of the conditional branch, as opposed to the else-side. The program counter included in the divergence token has a value of 2, which is the not-taken program counter and reflects the address of the first instruction associated with the if-side of the conditional branch (i.e., the fall-through instruction).

Multithreaded processing unit 616 sets active mask 618 to a value of [11111000], which is the taken mask, thereby activating the five threads that execute the else-side of the conditional branch and disabling the three threads that execute the if-side of the conditional branch (step 312). Multithreaded processing unit 616 also sets active program counter 620 to a value of 4, which is the value of the taken program counter and reflects the address of the first instruction associated with the else-side of the conditional branch (step 312). The five active threads branch to this address. As seen in FIG. 6A, the "else" label indicates the else-side of the conditional branch.

Multithreaded processing unit 616 then fetches the call instruction, which corresponds to a program counter value of 4 (step 514). Since the call instruction is a branch instruction, but does not include a set-synchronization bit, multithreaded processing unit 616 pushes only a call token onto stack 614 (steps 504, 508, 510, 522 and 326). The mask included in the call token has a value of [11111000], which reflects the value of the active mask when the call instruction was encountered. The program counter included in the call token has a value of 5, which is the return program counter and reflects the address of the instruction following the call instruction in the program (i.e., the fall-through instruction).

As indicated in FIG. 6A, the Update subroutine is the subroutine associated with the call/return branch. Therefore, multithreaded processing unit 616 sets active program counter 620 to a value of 10, which is the taken program counter and reflects the address of the first instruction of the Update subroutine (step 328). Since there are no thread divergences associated with a call/return branch, all five threads remain active and execute this branch. Thus, the value of active mask 618 remains [11111000].

Multithreaded processing unit 616 then fetches the fmul instruction, which corresponds to a program counter value of 10 (step 514). Since this instruction is not a branch instruction and does not include a pop-synchronization bit, multithreaded processing unit 616 executes the instruction (steps 504, 506 and 518), multiplying R0 and R1. Further, since no branch instruction was encountered, the value of active mask 618 remains [11111000].

Active program counter 620 is then incremented to a value of 11 (step 526), and multithreaded processing unit 616 fetches the return instruction, which corresponds to a program counter value of 11 (step 502). Multithreaded processing unit then pops the token on the top of stack 614 (steps 504, 508 and 512). As previously described herein, since the instruction is a return instruction, the popped token will be a call token. Multithreaded processing unit 616 sets active mask 618 to a value of [11111000], which is the value of the mask included in the call token, and active program counter 620 to a value of 5, which is the value of the return program counter included in the call token (step 512). This process causes the five active threads to branch to the instruction having the address reflected by the return program counter.

Multithreaded processing unit 616 then fetches the fadd instruction, which corresponds to a program counter value of 5 (step 514). Since this instruction is not a branch instruction and does not include a pop-synchronization bit, multithreaded processing unit 616 executes this instruction (steps 504, 506 and 518), adding R0 and 2. Again, since no branch instruction was encountered, the value of active mask 618 remains [11111000].

Active program counter 620 is then incremented to a value of 6 (step 526), and multithreaded processing unit 616 fetches the fsub.s instruction, which corresponds to a program counter value of 11 (step 502). Since this instruction is not a branch instruction, but includes a pop-synchronization bit, and a divergence token (not a synchronization token) is on the top of stack 614, multithreaded processing unit 616 pops the divergence token from the top of stack 614 (steps 504, 506, 516 and 522). Multithreaded processing unit 616 sets active mask 618 to a value of [00000111], which is the value of the mask included in the divergence token, thereby activating the three threads that execute the if-side of the conditional branch and disabling the five threads that just completed executing the else-side (step 522). Multithreaded processing unit 616 also sets active program counter 620 to a value of 2, which is the value of the not-taken program counter included in the divergence token and reflects the address of the first instruction associated with the if-side of the conditional branch (step 522).

Multithreaded processing unit 616 then fetches the fadd instruction, which corresponds to a program counter value of 2 (step 514). Since this instruction is not a branch instruction and does not include a pop-synchronization bit, multithreaded processing unit 616 executes the instruction (steps 504, 506 and 518), adding R0 and 1. Further, since no branch instruction was encountered, the value of active mask 618 remains [00000111].

Active program counter 620 is then incremented to a value of 3 (step 526), and multithreaded processing unit 616 fetches the bra instruction, which corresponds to a program counter value of 3 (step 502). This instruction is a branch instruction, but not a return or break instruction, and does not include a set-synchronization bit. Further, all three active threads take the branch associated with this instruction. Therefore, multithreaded processing unit 616 sets active mask 618 to a value of [00000111], which is the value of the taken mask, and active program counter 620 to a value of 6, which is the value of the taken program counter (steps 504, 508, 510, 302, 306, 309 and 312). As shown in FIG. 6A, the bra instruction causes the three active threads to branch to the fsub.s instruction, as indicated by the "Endlf" label.

Multithreaded processing unit 616 then fetches the fsub.s instruction, which corresponds to a program counter value of 6 (step 514). Since the fsub.s instruction is not a branch instruction, but includes a pop-synchronization bit, and a synchronization token is on the top of stack 614, multithreaded processing unit 616 pops the synchronization token from the top of stack 614 (steps 504, 506, 516 and 520). Multithreaded processing unit 616 sets active mask 618 to a value of [11111111], which is the value of the mask included in the synchronization token, thereby activating all eight threads in the thread group. With this step, all of the threads that were active when the branch instruction including the set-synchronization bit corresponding to the popped synchronization token was encountered (i.e., when the bra.s instruction was encountered) are reactivated. Thus, the level of thread synchronization that existed when the bra.s instruction was originally encountered is reestablished.

Finally, multithreaded processing unit 614 executes the fsub instruction, subtracting R0 from R1.

FIG. 6C sets forth the C programming language pseudocode for the program instructions of FIG. 6A.

One advantage of the disclosed system and method is that they enable threads in a multithreaded architecture to be broken into several thread groups, where the number of threads in each group is based on the size of the active mask. When a branch in a program is encountered, each thread group is able to traverse the branch independently of the other thread groups. Thus, the thread groups that do not execute a branch do not have to be disabled while the branch is being executed. Further, the disclosed system and method provide an efficient mechanism for managing thread divergences within a particular thread group when that thread group executes one or more branches in a program. The result is a system that operates in full SIMD mode when possible and suffers only minimal performance degradation when thread divergences occur within a particular thread group as a branch is executed.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for managing divergent threads in a thread group executing on a multi-threaded processing unit, the method of comprising:
    fetching a program instruction specified by an active program counter associated with the thread group;
    determining that the program instruction is a branch instruction;
    determining whether the branch instruction is a break instruction or a return instruction; and
    if the branch instruction is a break instruction or a return instruction, then updating an active mask associated with the thread group, or
    if the branch instruction is not a break instruction or a return instruction, then:
        determining that the branch instruction is a conditional branch instruction associated with a condition, and
        pushing at least one token that includes a divergence token into a token stack associated with the thread group, wherein each token pushed into the token stack includes a mask indicating the state of each thread in the thread group prior to the execution of the branch instruction, the state of each thread subsequent to the execution of the branch instruction is determined based on the type and configuration of the branch instruction, and a program counter associated with the divergence token is set to a not-taken program counter; and
    updating the active program counter associated with the thread group, wherein the manner in which the active program counter is updated depends on the type of the branch instruction,
    wherein the thread group includes a plurality of threads.

2. The method of claim 1, wherein the configuration of the branch instruction indicates a set-sync bit and the at least one token includes a synchronization token, and wherein the mask associated with the synchronization token corresponds to the active mask associated with the thread group when the synchronization token is pushed into the token stack.

3. The method of claim 1, further comprising of determining whether the condition associated with the branch instruction is satisfied for any currently active threads specified in the active mask associated with the thread group.

4. The method of claim 3, wherein the condition is satisfied for some but not all of the currently active threads and the mask associated with the divergence token indicates that at least one thread within the thread group does not satisfy the condition.

5. The method of claim 3, wherein the condition is satisfied for all of the currently active threads, and the step of updating the active program counter includes setting the active program counter to a taken program counter.

6. The method of claim 3, wherein the condition is satisfied for none of the currently active threads, and the step of updating the active program counter includes incrementing the active program counter.

7. The method of claim 1, wherein the type of the branch instruction is a call branch instruction, the at least one token includes a call token, the mask associated with the call token is retrieved from an active mask associated with the thread group, and a program counter associated with the call token is set to a return program counter.

8. The method of claim 7, wherein the step of updating the active program counter includes setting the active program counter equal to a taken program counter.

9. The method of claim 1, wherein the type of the branch instruction is a pre-break branch instruction, the at least one token includes a break token, the mask associated with the break token is retrieved from an active mask associated with the thread group, and a program counter associated with the break token is set to an after-loop program counter.

10. A computing system configured to manage divergent threads in a thread group, the computing system comprising:
    a token stack configured to store at least one token; and
    a multithreaded processing unit configured to:
        fetch a program instruction specified by an active program counter associated with the thread group,
        determine that the program instruction is a branch instruction,
        determine whether the branch instruction is a break instruction or a return instruction, and
        if the branch instruction is a break instruction or a return instruction, then updating an active mask associated with the thread group, or
        if the branch instruction is not a break instruction or a return instruction, then:
            determining that the branch instruction is a conditional branch instruction associated with a condition, and
            push at least one token that includes a divergence token into a token stack associated with the thread group, wherein each token pushed into the token stack includes a mask indicating the state of each thread in the thread group prior to the execution of the branch instruction, the state of each thread subsequent to the execution of the branch instruction is determined based on the type and configuration of the branch instruction, and a program counter associated with the divergence token is set to a not-taken program counter; and
        update the active program counter associated with the thread group, wherein the manner in which the active program counter is updated depends on the type of the branch instruction,
    wherein the thread group includes a plurality of threads.

11. The computing system of claim 10, wherein the configuration of the branch instruction indicates a set-sync bit and the at least one token includes a synchronization token, and wherein the mask associated with the synchronization token corresponds to the active mask associated with the thread group when the synchronization token is pushed into the token stack.

12. The computing system of claim 10, wherein the multithreaded processing unit is further configured to determine whether the condition associated with the branch instruction is satisfied for any currently active threads specified in the active mask associated with the thread group.

13. The computing system of claim 12, wherein the condition is satisfied for some but not all of the currently active threads and the mask associated with the divergence token indicates that at least one thread within the thread group does not satisfy the condition.

14. The computing system of claim 12, wherein the condition is satisfied for all of the currently active threads, and the step of updating the active program counter includes setting the active program counter to a taken program counter.

15. The computing system of claim 12, wherein the condition is satisfied for none of the currently active threads, and updating the active program counter includes incrementing the active program counter.

16. The computing system of claim 10, wherein the type of the branch instruction is a call branch instruction, the at least one token includes a call token, the mask associated with the call token is retrieved from an active mask associated with the thread group, and a program counter associated with the call token is set to a return program counter.

17. The computing system of claim 16, wherein updating the active program counter includes setting the active program counter equal to a taken program counter.

18. The computing system of claim 10, wherein the type of the branch instruction is a pre-break branch instruction, the at least one token includes a break token, the mask associated with the break token is retrieved from an active mask associated with the thread group, and a program counter associated with the break token is set to an after-loop program counter.

* * * * *

UNITED STATES PATENT AND TRADEMARK OFFICE
CERTIFICATE OF CORRECTION

| | | |
|---|---|---|
| PATENT NO. | : 8,667,256 B1 | Page 1 of 1 |
| APPLICATION NO. | : 12/476088 | |
| DATED | : March 4, 2014 | |
| INVENTOR(S) | : Coon et al. | |

It is certified that error appears in the above-identified patent and that said Letters Patent is hereby corrected as shown below:

Claims:

Column 17, Claim 3, Line 62, please delete "of".

Signed and Sealed this
Eighth Day of July, 2014

Michelle K. Lee
*Deputy Director of the United States Patent and Trademark Office*